(12) United States Patent
Rauch et al.

(10) Patent No.: US 10,601,276 B2
(45) Date of Patent: Mar. 24, 2020

(54) ELECTRIC MACHINE

(71) Applicant: ZF FRIEDRICHSHAFEN AG, Friedrichshafen (DE)

(72) Inventors: Matthias Rauch, Frankenwinheim (DE); Manfred Zimmer, Zeil (DE); Christian Brueckner, Rimpar (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 774 days.

(21) Appl. No.: 14/907,516

(22) PCT Filed: Jun. 23, 2014

(86) PCT No.: PCT/EP2014/063127
§ 371 (c)(1),
(2) Date: Jan. 25, 2016

(87) PCT Pub. No.: WO2015/010838
PCT Pub. Date: Jan. 29, 2015

(65) Prior Publication Data
US 2016/0164366 A1 Jun. 9, 2016

(30) Foreign Application Priority Data
Jul. 23, 2013 (DE) .................. 10 2013 214 386

(51) Int. Cl.
*H02K 3/38* (2006.01)
*H02K 5/22* (2006.01)
*H02K 3/52* (2006.01)

(52) U.S. Cl.
CPC .............. *H02K 3/38* (2013.01); *H02K 3/522* (2013.01); *H02K 5/225* (2013.01); *H02K 2203/09* (2013.01)

(58) Field of Classification Search
CPC .......... H02K 3/38; H02K 5/225; H02K 3/522; H02K 2203/09; B29C 44/14; B29C 45/15; B29K 105/20
(Continued)

(56) References Cited

U.S. PATENT DOCUMENTS 4,132,460 A 1/1979 Porta
6,369,473 B1 * 4/2002 Baumeister ............ H02K 3/522
310/71
(Continued)

FOREIGN PATENT DOCUMENTS

DE 10 2011 055 803 6/2012
EP 1 677 404 7/2006
(Continued)

OTHER PUBLICATIONS

English Machine Translation of JP 3735229 B2. (Year: 2006).*

*Primary Examiner* — Burton S Mullins
(74) *Attorney, Agent, or Firm* — Cozen O'Connor

(57) ABSTRACT

Electric machine having a rotor and a stator with stator coils arranged thereon, a wiring arrangement with a conductor support element and with connection conductors arranged at the latter, which connection conductors are connected to winding ends of the stator coils inside a wiring area. The wiring area is filled with an insulating potting material. The potting material has a cable feedthrough structure in the form of a free space forming a passage through the potting material.

13 Claims, 4 Drawing Sheets

(58) Field of Classification Search
USPC .................................................... 310/43, 71
See application file for complete search history.

(56) References Cited

U.S. PATENT DOCUMENTS

| | | | | |
|---|---|---|---|---|
| 7,034,419 | B2* | 4/2006 | Kabasawa | H02K 3/522 |
| | | | | 310/260 |
| 8,183,728 | B2* | 5/2012 | Schaflein | H02K 3/522 |
| | | | | 310/71 |
| 8,350,427 | B2* | 1/2013 | Sugiyama | H02K 3/522 |
| | | | | 310/184 |
| 8,692,424 | B2* | 4/2014 | Bohrer | H02K 3/522 |
| | | | | 29/596 |
| 2007/0278876 | A1 | 12/2007 | Hidehiro | |
| 2010/0156208 | A1* | 6/2010 | Schaflein | H02K 3/522 |
| | | | | 310/71 |
| 2012/0112582 | A1* | 5/2012 | Kim | B62D 5/0403 |
| | | | | 310/71 |
| 2012/0286593 | A1* | 11/2012 | Yokogawa | H02K 1/278 |
| | | | | 310/43 |
| 2012/0313460 | A1* | 12/2012 | Schaflein | H02K 5/225 |
| | | | | 310/43 |
| 2013/0064697 | A1 | 3/2013 | Fukasaku | |

FOREIGN PATENT DOCUMENTS

| | | | |
|---|---|---|---|
| EP | 2 139 094 | 12/2009 | |
| FR | 2 530 885 | 1/1984 | |
| FR | 2 805 675 | 8/2001 | |
| JP | 3735229 B2 * | 1/2006 | ............... H02K 5/22 |
| JP | 2008 029090 | 2/2008 | |

* cited by examiner

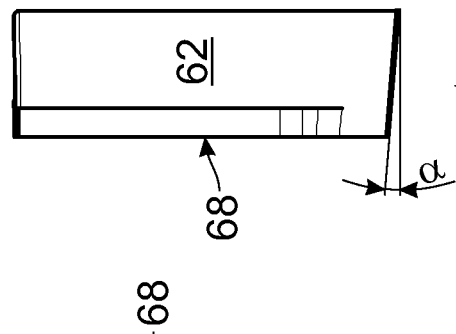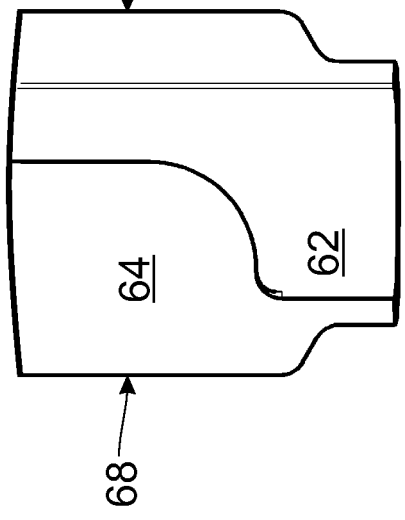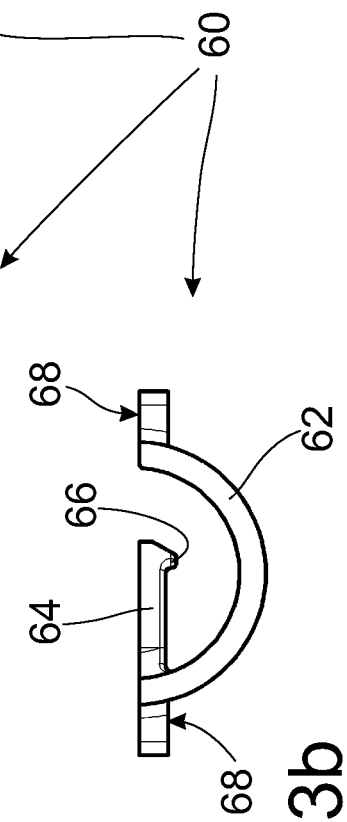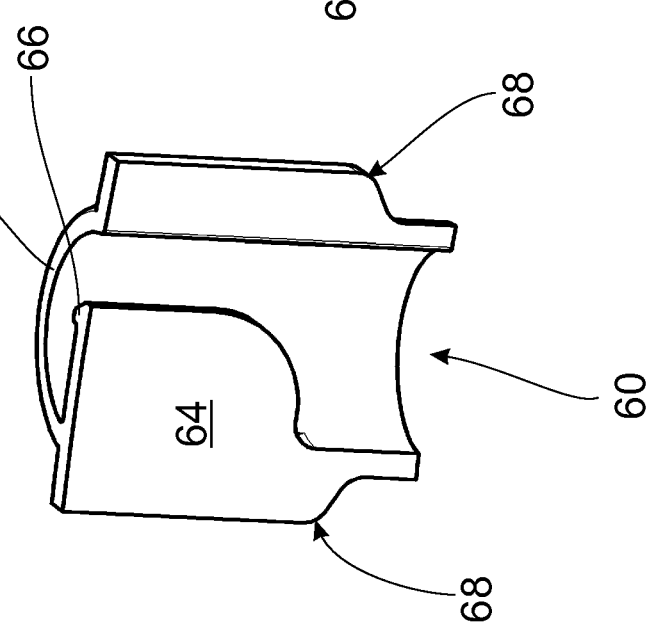

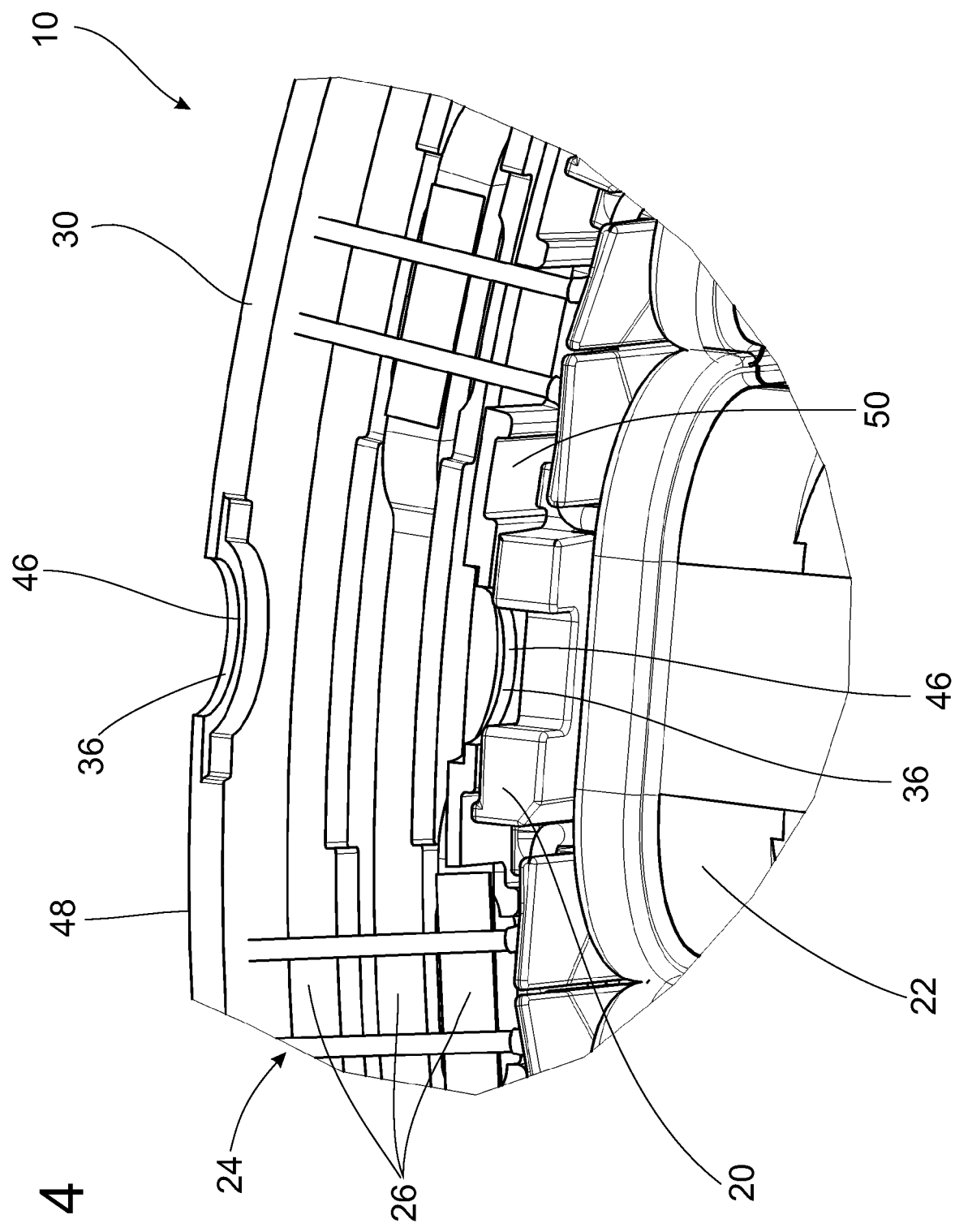

ELECTRIC MACHINE

CROSS REFERENCE TO PRIOR APPLICATIONS

This is a U.S. national stage of application No. PCT/EP2014/063127, filed on Jun. 23, 2014. Priority is claimed on German Application No.: DE102013214386.9 filed Jul. 23, 2013 the content of which is incorporated here by reference.

BACKGROUND OF THE INVENTION

1. Field of the Invention

The invention is directed to an electric machine.

2. Detailed Description of the Prior Art

An electric machine is used, inter alia, in motor vehicles and is known from EP 2 139 094 A1. Present-day development of electric machines leads to increasingly complex and compact modes of construction. Therefore, more and more sensors, for example, temperature sensors and magnetic sensors, as well as new assemblies, e.g., an actuator for a friction clutch, are integrated. In this respect, it is required that the cables, lines, hoses, etc. needed for this purpose be integrated in electric machines in a space-saving manner in the overall construction, and a particular difficulty consists in introducing them from the outside into a closed receiving space within an annular stator in a space-saving manner.

SUMMARY OF THE INVENTION

Accordingly, the object is to arrange cables, lines, hoses, etc. in the electric machines in the most space-saving manner possible.

This object is met by an electric machine.

According to one embodiment of the invention, a generic electric machine is disclosed in which the potting material has a cable feedthrough structure in the form of a free space forming a passage through the potting material.

An electric machine constructed in this way makes it possible to arrange cables, lines, and hoses inside the electric machine in a space-saving manner. The specially provided free space, which is not present in standard potting allows the cables, lines, or hoses to be guided through and arranged inside the cable feedthrough structure. The position of the cable feedthrough structure in circumferential direction at the stator is freely selectable depending on requirements such that, for example, it is far enough away from a power connection of the connection conductors to reduce electromagnetic effects to the greatest possible extent. The electric machine illustrated here economizes on installation space compared to other solutions.

Unless stated otherwise, the expression "cable" includes hereinafter lines and hoses.

In one embodiment, the cable feedthrough structure is arranged at a potting surface located opposite the connection conductors. One of the advantages of this variant is that the cable need not be pulled into the cable feedthrough structure during assembly, but rather can be inserted laterally. Among other reasons, this is advantageous when the cable terminates at or is connected to the sensor or component provided for it already before arranging and positioning the cable inside the cable feedthrough structure. This facilitates assembly.

The cable feedthrough structure is advantageously trough-shaped, i.e., is formed with an open side or an at least partially open side.

An electric cable is advantageously arranged inside the cable feedthrough structure. However, it is also conceivable to arrange hoses, for example, for water cooling, in the cable feedthrough structure. Further, viewed in a cable feedthrough direction, only a portion of the cable cross section or hose cross section can also be arranged inside the depression, particularly trough, in the cable feedthrough structure.

In one embodiment, the cable feedthrough structure is formed by a cable feedthrough element. The cable feedthrough element is arranged at or inside the wiring area of the conductor support element and forms the free space of the cable feedthrough structure after potting. This makes it possible to produce the cable feedthrough structure in a simple, reproducible and uniform manner.

A lug that projects into the free space is advantageously arranged at the cable feedthrough element. By arranging the cable feedthrough element at the potting surface, the lug makes it possible to fixedly position the cable inside the cable feedthrough structure at least during assembly.

In a further development, retaining elements are arranged at the cable feedthrough, preferably at the lug. These retaining elements can be formed as holding rib that advantageously faces toward the inner side of the cable feedthrough. This holding rib makes it possible to fix the cable or hose inside the cable feedthrough element. This fixing reliably prevents the cable from springing out or falling out of the cable feedthrough structure during assembly or in operation. This fixing is especially advantageous during assembly because a cable that has fallen out or sprung out and is not arranged in the desired position inside or at the cable feedthrough structure can be sheared off or damaged when installing further components.

According to a further embodiment, it is advantageous to form the lug over only a portion of the cable feedthrough element. This is advantageous, for example, when a further component part extends on one side and partially into the region of the cable feedthrough structure to receive and further guide the cable directly at the cable feedthrough element, for example, with an arm.

In a further advantageous embodiment, the cable feedthrough element is secured to the conductor support element. A possible fastening can be effected by clamping the cable feedthrough element between two walls of the conductor support element, but other fastening possibilities are also conceivable, e.g., gluing or fixing with a clip. It has proven advantageous when the conductor support element has corresponding receptacles into which the cable feedthrough element is inserted and cutouts through which the cable is guided. The position of the cable feedthrough element is accordingly fixed when the potting material is introduced and also thereafter. It is not absolutely necessary to fix the position of the cable feedthrough element. If the cable feedthrough element is positioned at the predetermined location, for example, by a retaining arm, when the potting material is introduced, it is fixed thereafter by the potting. If the cable feedthrough element is arranged at the potting surface, the possibility exists that the cable feedthrough element will become loose due to vibrations. For this reason, and for reasons relating to installation space, at least one further structural component part is arranged in such a way that the cable feedthrough element is additionally secured at its specified position.

Mounting portions are advantageously arranged laterally at the cable feedthrough element facing away from the free space. The mounting portions are preferably substantially parallel to one another and lie substantially on a plane which is in turn substantially parallel to and aligned with the potting surface. Together with the lug, the mounting portions form a large support surface to make it easier to position the cable feedthrough element and to press or insert the cable feedthrough element into the conductor support element. A different arrangement of the mounting portions and a different combination of the mounting portions and lug are, of course, also conceivable. Further, it is advantageous when the mounting portions are shaped in such a way that they engage in correspondingly shaped recesses in the conductor support element. Among other reasons, this is advantageous when other components engage in the cable feedthrough element and the installation position is predetermined by this.

It has proven advantageous that the cable feedthrough element is produced from a material that is dimensionally stable at least up to the melting temperature of the potting material. This rules out deformations of or damage to the cable feedthrough element during and after the introduction of the potting material.

In a particularly advantageous manner, the cable feedthrough element can be constructed as a plastic part.

According to a further preferred constructional variant, the cable feedthrough element is constructed so as to be electromagnetically shielding. This can be achieved, for example, when the cable feedthrough element is made of metal, e.g., copper or aluminum. In this way, electromagnetic effects occurring between the connection conductors and the guided-through cable are minimized. Since it is not desirable to use bare conductive components inside the wiring arrangement, a metallic cable feedthrough element can be coated with an insulating layer, e.g., of plastic or ceramic.

BRIEF DESCRIPTION OF THE DRAWINGS

The invention will be described by way of example in the following with reference to the accompanying drawings. The drawings show:

FIGS. 3a-d are different views of a cable feedthrough element;

FIG. 4 is a section of the stator from FIG. 1 with cutouts of a conductor support element.

DETAILED DESCRIPTION OF THE PRESENTLY PREFERRED EMBODIMENTS

Figure 1:
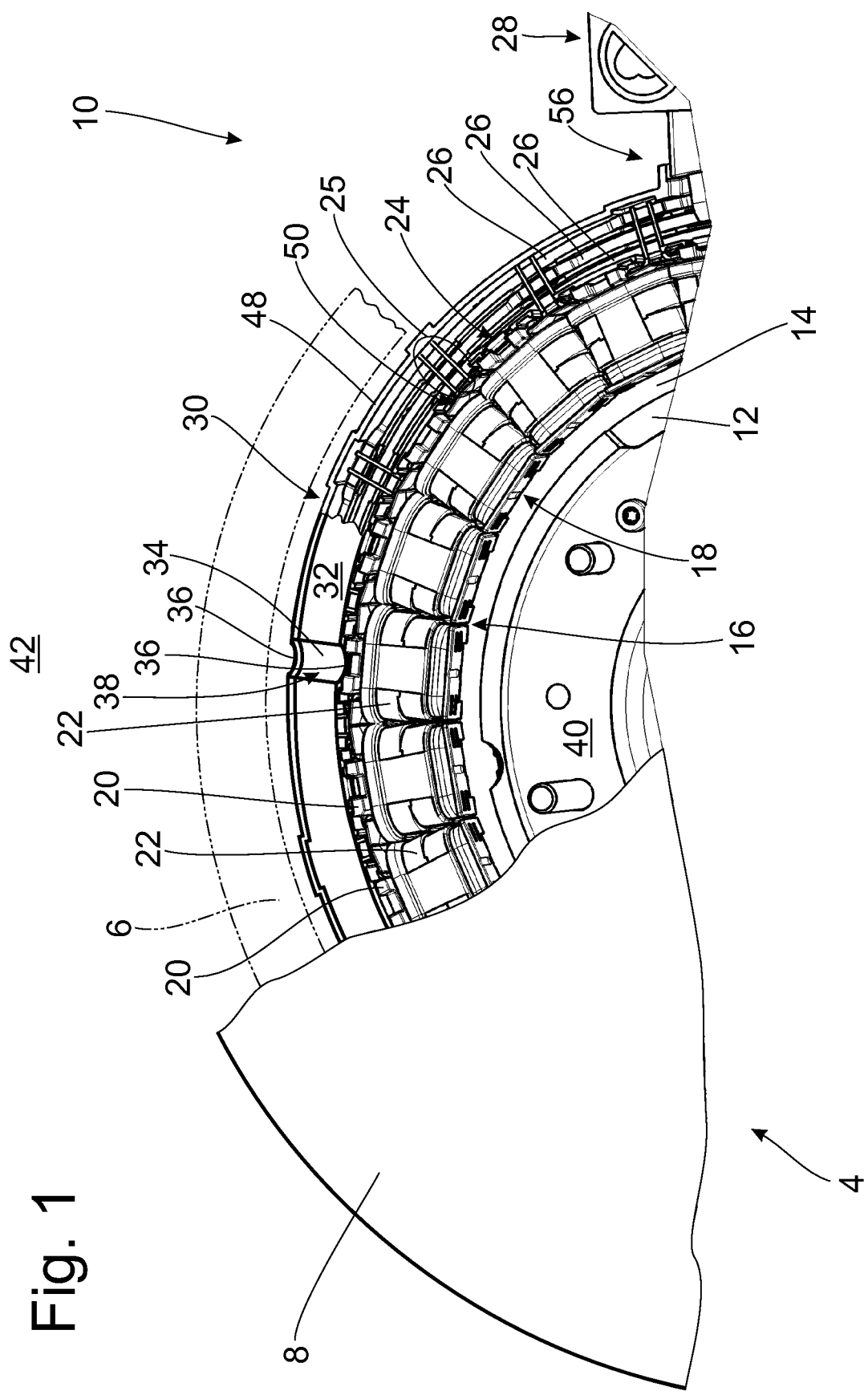
FIG. 1 is a stator of an electric machine with a cable feedthrough structure.

FIG. 1 shows an outer rotor type electric machine 4 with a stator 10 and a rotor 6 which is only schematically indicated. Further, the invention can also be integrated in other types of electric machines, for example, inner rotor type machines.

The stator 10 has a stator support 12 at which a stator stack 14 is arranged. The stator stack 14 has a yoke region 16 and a plurality of stator teeth 18 (not visible, although the arrangement at the stator is indicated) which are arranged on the radially outer side to be uniformly distributed at the yoke region 16. Further, the stator 10 has an insulating body 20 around which a stator coil 22 is wound in each instance; the combination of insulating body 20 and stator coil 22 forms a coil assembly. The insulating body 20 can be formed of a plurality of parts. A coil assembly is arranged in each instance at one of the stator teeth 18. The winding ends of the stator coils 22 are guided into a wiring arrangement 24 within which the stator coils 22 are connected to power electronics 28 in a wiring area 25 via connection conductors 26. The connection conductors 26 are embedded in a conductor support element 30, which serves inter alia as potting mold for potting 32. Further, a cover plate 8 (partially shown) is arranged at the stator 10. This cover plate 8 covers and closes the stator 10 such that a smallest possible axial installation width of the electric machine is achieved.

The potting 32 has a cable feedthrough structure 34 in the form of a free space with which cutouts 36 of the conductor support element 30 are associated. The cable feedthrough structure 34 and the cutouts 36 form a connection 38 between an interior space 40 and an exterior space 42 of the stator, which exterior space 42 is arranged radially with respect to the interior space 40. This connection 38 can be used inter alia to guide cables, lines, or hoses 44 into the interior space 40 of the stator 10.

In this embodiment, the cable feedthrough structure 34 is arranged at the potting surface located opposite the connection conductors 26. However, it is also possible to arrange the cable feedthrough structure 34 inside the potting 32 so that it is completely enclosed by the potting 32.

In this variant, the cable feedthrough structure 34 is trough-shaped, particularly half-circle-shaped, and electric cables and lines 44 are arranged inside the cable feedthrough structure 34.

Figure 2:
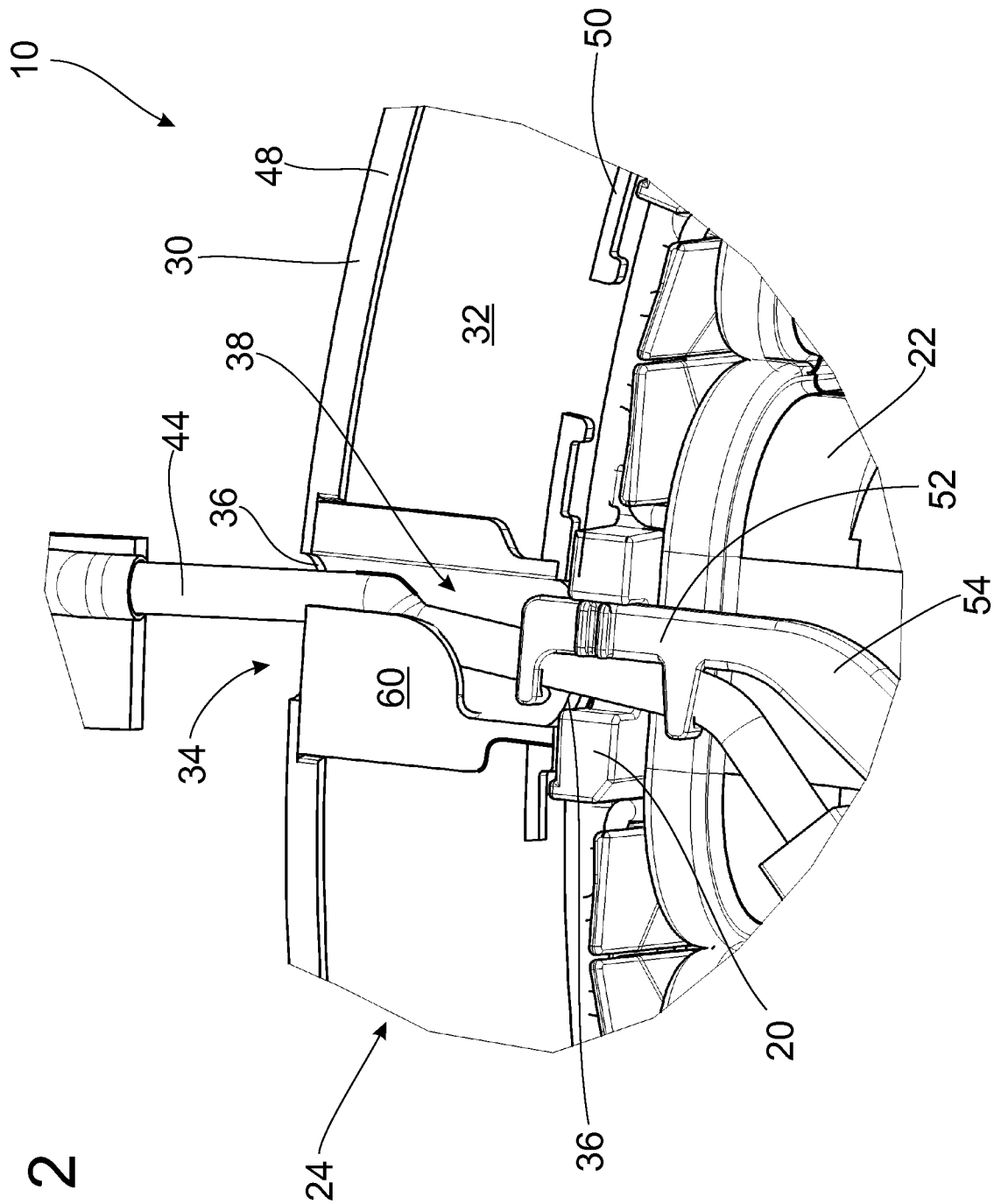
FIG. 2 is a section of the stator from FIG. 1 with a cable feedthrough element.

In a second constructional variant shown in FIG. 2, the cable feedthrough structure 34 is formed as a cable feedthrough element 60. This cable feedthrough element 60 is arranged at or fixed at the conductor support element 30 and is partially enclosed by potting material. This is advantageous because the cable feedthrough structure 34 is uniformly reproducible independent of the potting 32.

The cable feedthrough element 60 is inter alia clamped between side walls 48, 50 of the conductor support element 30 which are sufficiently tilted inward toward the wiring area 25.

The cable feedthrough element 60 has a base body 62 which is trough-shaped, particularly half-circle-shaped. Arranged at this base body 62 are further elements that are advantageous for this application and that are shown in FIGS. 2 and 3 a-d. These embodiments are advantageous depending on the specific application.

A lug 64 that protrudes into the free space of the cable feedthrough element is arranged at the base body 62. This lug 64 serves inter alia as a cover behind which the cable 44 is installed so as to be protected.

Further, retaining elements in the form of a holding rib 66 are arranged at the lug 64 so as to face the base body 62 and hold a cable 44 between base body 62, lug 64 and holding rib 55, this cable 44 being arranged in the cable feedthrough structure 34. A cable 44 positioned in this way is fixed inside the cable feedthrough element 60. This is advantageous particularly during assembly because once a cable 44 has been positioned it stays at the predetermined location and can no longer be sheared off or damaged by installing further elements, for example, the cover plate.

Further, mounting portions 68, which face away from the base body 64, are arranged at the base body 62. The mounting portions 68 are arranged substantially parallel to one another and substantially parallel to the lug 64 to generate a large support surface. This support surface makes it possible to simply press into suitable receptacles 46 of the conductor support element 30. The support surface comprising lug 64 and mounting portions 68 is arranged at the potting surface substantially parallel to it.

In order to specify a definite installation direction, mounting portions 68 are formed only over a portion of the length of the cable feedthrough element 60. Combined with the construction of the mounting portions 68, the correspondingly constructed receptacles 46 of the conductor support element 30 shown in FIG. 4 define a definite installation direction.

The installation direction can be predetermined when the lug 64 is formed over only a portion of the cable feedthrough element 60. This is the case when a component part, for example, an arm 52 of a temperature sensor holder 54, partially engages in the cable feedthrough element 60 to take over and further guide the cable 44.

Since the side walls 48, 50 are tilted relative to one another, i.e., toward the wiring area 25, the contact area, which is located on the inner side in the assembled condition, is beveled (FIG. 3c) at an angle $\alpha$ to facilitate insertion of the cable feedthrough element 60. During assembly, the cable feedthrough element 60 is first placed by its beveled edge at the suitable receptacle 46 of the conductor support element 30 and is then pressed into the receptacle 46 of the opposite side. In addition to this, the contact area of the cable feedthrough element 60 opposite the beveled contact area is adapted to the curvature of the conductor support element 30 (FIG. 3d).

In order that the cable feedthrough element 60 does not undergo any deformation or damage when introducing the potting material, it is advantageous to use a material that is dimensionally stable even at the melting temperature of the potting material. The material can be the same material as that used for the conductor support element 30.

In a preferred variant, the cable feedthrough element 60 is constructed as plastic part.

Alternatively, the cable feedthrough element 60 can be constructed so as to be electromagnetically shielding. This reduces electromagnetic effects between the connection conductors 26 and cables 44 which are arranged inside the cable feedthrough element 60.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electric machine comprising:
    a rotor;
    a stator;
    stator coils arranged on the stator;
    connection conductors connected to winding ends of the stator coils inside a wiring area;
    a wiring arrangement having a conductor support element at which the connection conductors are arranged;
    an insulating potting material filling the wiring area;
    a cable feedthrough structure defined by the insulating potting material in the form of a feedthrough passage through the insulating potting material that is free of the insulating potting material and configured as a free space; and
    an electric cable arranged inside the free space of the cable feedthrough structure,
    wherein the electric cable is guided through the cable feedthrough structure after potting the insulating potting material filling the wiring area.

2. The electric machine according to claim 1, wherein the cable feedthrough structure is arranged at a potting surface located opposite the connection conductors.

3. The electric machine according to claim 2, wherein the cable feedthrough structure is trough-shaped.

4. The electric machine according to claim 2, wherein a cable feedthrough element is inserted in the cable feedthrough structure.

5. The electric machine according to claim 4, further comprising a lug that projects into the free space of the cable feedthrough element and is arranged at the cable feedthrough structure element.

6. The electric machine according to claim 5, wherein the cable feedthrough element further comprises a retaining element.

7. The electric machine according to claim 6, wherein mounting portions are arranged at the cable feedthrough element.

8. The electric machine according to claim 7, wherein the lug and the mounting portions are arranged substantially on a plane, wherein the plane is oriented substantially parallel to the potting surface.

9. The electric machine according to claim 6, wherein the retaining element is a rib.

10. The electric machine according to claim 4, wherein the cable feedthrough element is secured to the conductor support element.

11. The electric machine according to claim 4, wherein the cable feedthrough element is produced from a material that is dimensionally stable at least up to a melting temperature of the insulating potting material.

12. The electric machine according to claim 4, wherein the cable feedthrough element is constructed as plastic part.

13. The electric machine according to claim 4, wherein the cable feedthrough element is electromagnetically shielding.

* * * * *